(12) United States Patent
Li

(10) Patent No.: US 11,036,115 B2
(45) Date of Patent: Jun. 15, 2021

(54) PHOTOGRAPHIC EQUIPMENT SUPPORT

(71) Applicant: Shenzhen Youbaise Technology Co., Ltd., Shenzhen (CN)

(72) Inventor: Dinglan Li, Shenzhen (CN)

(*) Notice: Subject to any disclaimer, the term of this patent is extended or adjusted under 35 U.S.C. 154(b) by 0 days.

(21) Appl. No.: 16/724,354

(22) Filed: Dec. 22, 2019

(65) Prior Publication Data
US 2020/0124948 A1    Apr. 23, 2020

(51) Int. Cl.
*G03B 17/56* (2021.01)
*F16M 11/14* (2006.01)
*H04M 1/04* (2006.01)

(52) U.S. Cl.
CPC .......... *G03B 17/561* (2013.01); *F16M 11/14* (2013.01); *F16M 2200/028* (2013.01); *H04M 1/04* (2013.01)

(58) Field of Classification Search
USPC ............................ 396/428; 248/186.2, 187.1
See application file for complete search history.

(56) References Cited

U.S. PATENT DOCUMENTS 6,824,319 B1 * 11/2004 Speggiorin ............. F16C 11/10
248/168
8,794,853 B2 * 8/2014 Piccoli ............... F16M 11/2014
396/428

* cited by examiner

*Primary Examiner* — Clayton E. LaBalle
*Assistant Examiner* — Warren K Fenwick

(57) ABSTRACT

A photographic equipment support, comprising a support frame and a fixing component, wherein support frame has a first mounting axis, fixing component comprises a fixing device, a second mounting axis, a first locking sleeve, a second locking sleeve, a bolt and a locking member, fixing device is used to fix photographic equipment, fixing device is fixed on the second mounting axis, first locking sleeve is sleeved on the first mounting axis, second locking sleeve is sleeved on the second mounting axis, the bolt passes through mounting holes on first locking sleeve and second locking sleeve, locking member is threadedly connected to bolt, first locking sleeve has a first limiting structure, second locking sleeve has a second limiting structure matching first limiting structure, and when first locking sleeve and second locking sleeve are locked, first limiting structure and second limiting structure cooperate with each other.

14 Claims, 6 Drawing Sheets

PHOTOGRAPHIC EQUIPMENT SUPPORT

TECHNICAL FIELD

The present invention relates to the technical field of photographic auxiliary devices, and in particular, to a photographic equipment support.

BACKGROUND

The current photographic equipment support generally has a tripod and a pan-tilt. The pan-tilt is connected to the tripod through a telescopic rod, or the foot of the tripod is in the form of a telescopic rod. The pan-tilt fixes the photographic equipment and adjusts the telescopic length of the telescopic rod to change the height of the pan-tilt with respect to the tripod, so as to adjust the shooting height, of the photographic equipment. When the angle is adjusted, an angle adjustment device (such as a spherical device) on the pan-tilt needs to be used, to adjust the shooting angle, and the range of the angle adjustment is limited.

SUMMARY

In view of this, in order to solve one of the technical problems in the related technology to a certain extent, it is necessary to provide a photographic equipment support, which is more convenient to use.

The present invention provides a photographic equipment support, comprising a support frame and a fixing component, wherein the support frame has a first mounting axis, the fixing component comprises a fixing device, a second mounting axis, a first locking sleeve, a second locking sleeve, a bolt and a locking member, the fixing device is used to fix photographic equipment, the fixing device is fixed on the second mounting axis, the first locking sleeve is sleeved on the first mounting axis, the second locking sleeve is sleeved on, the second mounting axis, the bolt passes through the mounting holes on the first locking sleeve and the second locking sleeve, the locking member is threadedly connected to the bolt, the first locking sleeve has a first limiting structure, the second locking sleeve has a second limiting structure matching the first limiting structure, and when the first locking sleeve and the second locking sleeve are locked, the first limiting structure and the second limiting structure cooperate with each other, so that the first locking sleeve and the second locking sleeve are relatively fixed.

According to the present invention, the first locking sleeve and the second locking sleeve can be locked on the first mounting axis and the second mounting axis by a single bolt at the same time, respectively. After locked, the first locking sleeve and the second locking sleeve are relatively locked, so that the second mounting axis is fixed with respect to the support frame. The angle of the photographic equipment with respect to the ground can be changed by changing the angle of the second locking sleeve with respect to the first locking sleeve and thereby changing the angle of the second mounting axis with respect to the first mounting axis. The height of the fixing device fixed on the second mounting axis changes while changing the angle of the second mounting axis.

DESCRIPTION OF THE EMBODIMENTS

Figure 1:
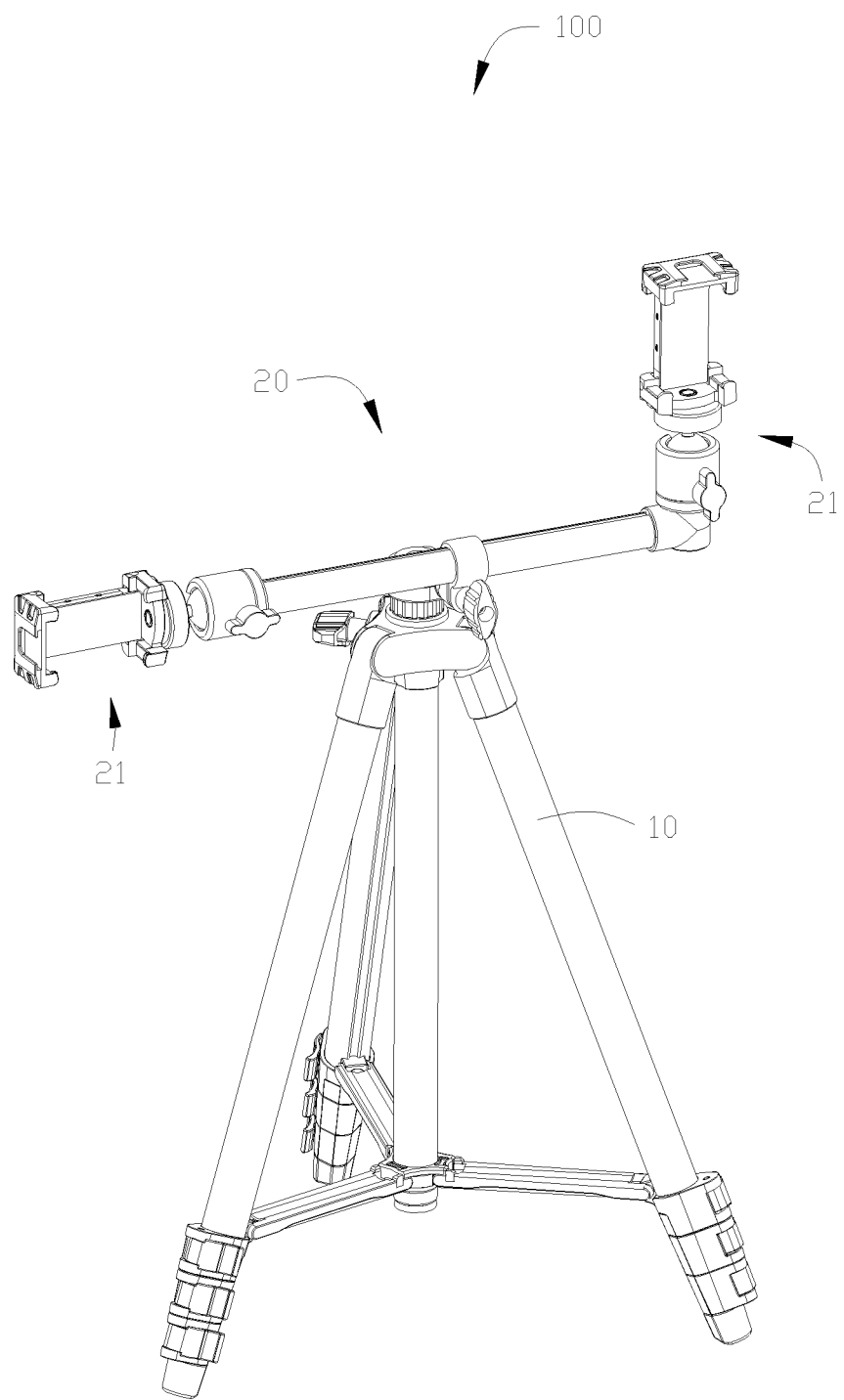
FIG. 1 is a schematic diagram illustrating the structure of a support according to an embodiment of the present invention.
Figure 2:
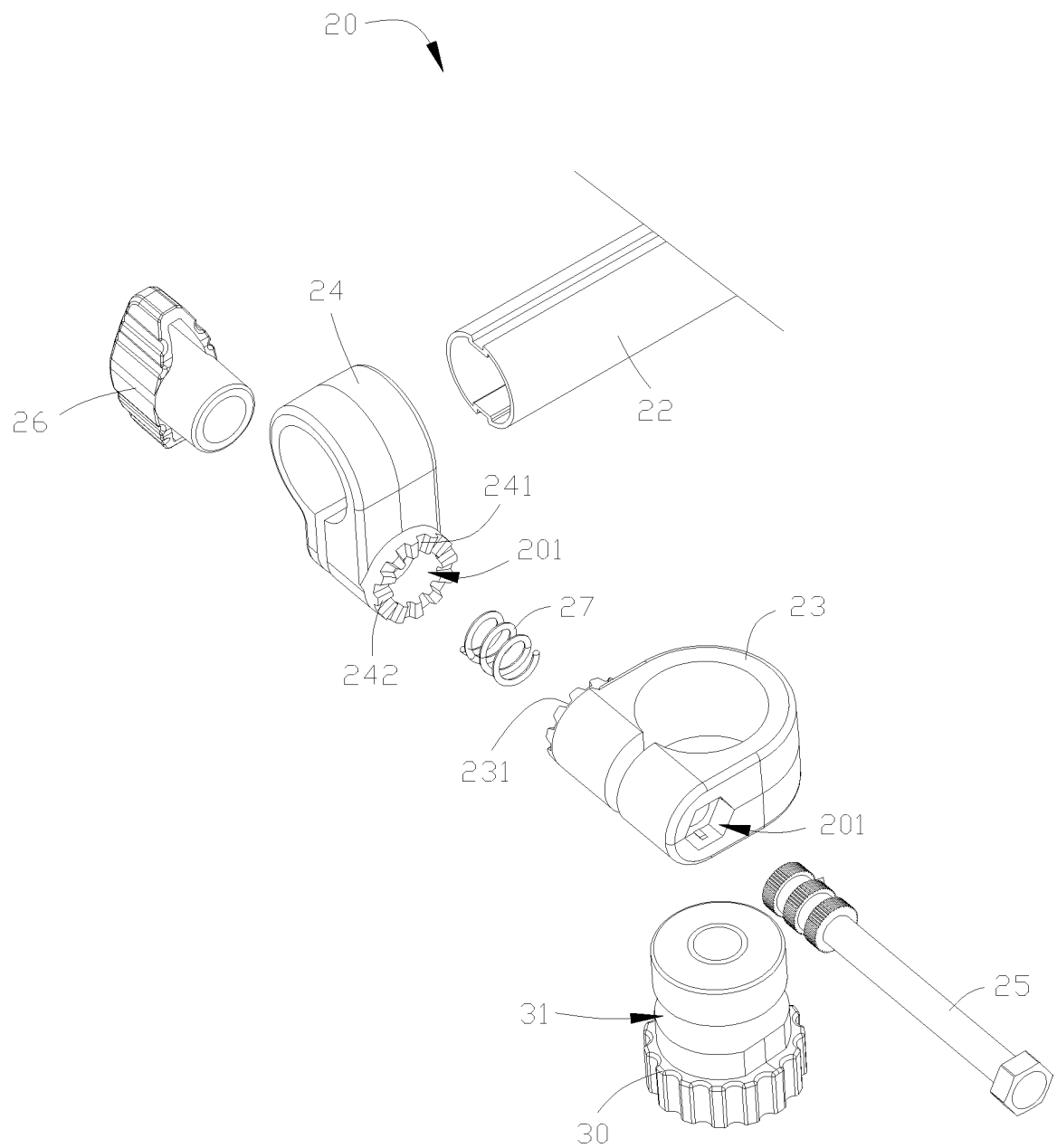
FIG. 2 is an exploded schematic diagram illustrating a fixing component in a first direction according to an embodiment of the present invention.
Figure 3:
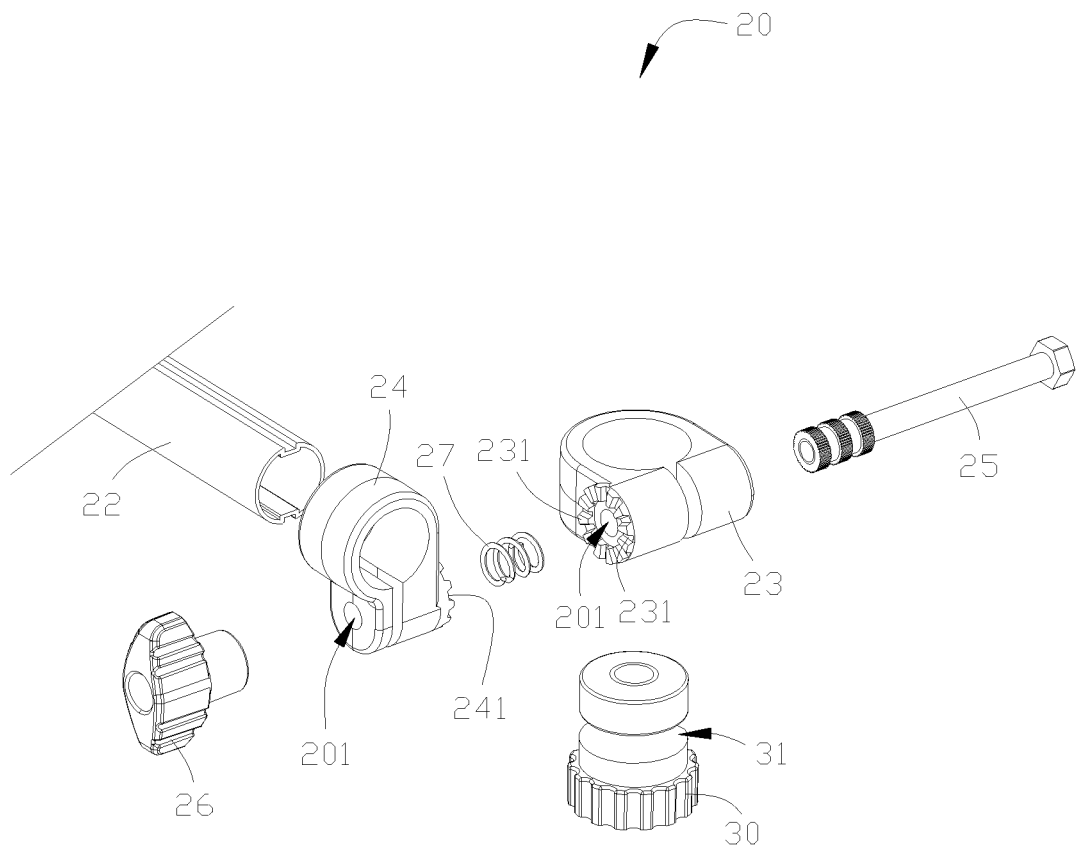
FIG. 3 is an exploded schematic diagram illustrating a fixing component in a second direction according to an embodiment of the present invention.
Figure 4:
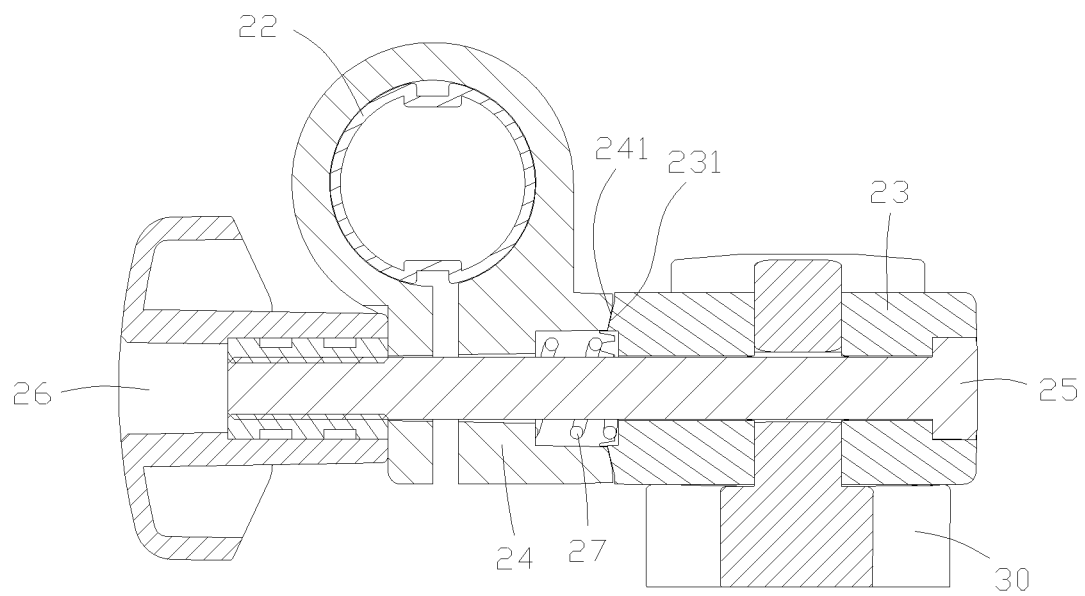
FIG. 4 is a cross-sectional diagram illustrating a fixing component according to an embodiment of the present invention, taken along an, axial direction of a bolt.

In the following, the technical solutions in the embodiments of the present invention will be clearly and completely described with reference to the drawings in the embodiments of the present invention. Obviously, the described embodiments are merely a part of the embodiments of the present invention, rather than all of the embodiments. Based on the embodiments of the present invention, all other embodiments obtained by those skilled in the art without creative efforts shall fall within the scope of protection of the present invention. It can be understood that the drawings are only provided for reference and illustration, and are not intended to limit the present invention. The connection relationship shown in the drawings is only for convenience of clear description, and does not limit the connection manner.

Refer to FIGS. 1-4. The present invention provides a photographic equipment support 100 for supporting photographic equipment, such as a mobile phone or a video camera. The support 100 comprises a support frame 10 and a fixing component 20. The support frame 10 may be a tripod. The support frame 10 may be mounted with a first mounting axis 30 on the top. The first mounting axis 30 is preferably fixed to the vertical axis at the top of the support 10. The fixing component 20 comprises a fixing, device 21, a second mounting axis 22, a first locking sleeve 23, a second locking sleeve 24, a bolt 25, and a locking member 26. The fixing device 21 is used to fix the photographic equipment. The fixing device 21 is fixed on the second mounting, axis 22, and preferably is fixed on an end of the second mounting axis 22, and of course fixed to other positions of the second mounting axis 22. The first locking sleeve 23 is sleeved on the first mounting axis 30, the first mounting axis 30 has a mounting hole 201, the second locking sleeve 24 is sleeved on the second mounting axis 22, and the first mounting axis 30 also has a mounting hole 201. The bolt 25 passes through the mounting holes 201 on the first locking sleeve 23 and the second locking sleeve 24. The locking member 26 is threadedly connected to the bolt 25. The locking member 26 is screwed, so that the locking member 26 can be gradually approached to the head of the bolt 25, so that the diameters of the first locking sleeve 23 and the second locking sleeve 24 can be reduced at the same time, thereby being fixed to the first mounting axis 30 and the second mounting axis 22. When the locking member 26 needs to be released, the first locking sleeve 23 and the second locking sleeve 24 can be released at the same time by screwing the locking member 26 in the opposite direction.

The first locking sleeve 23 has a first limiting structure, and the second locking sleeve 24 has a second limiting structure matching the first limiting structure. When the first locking sleeve 23 and the second locking sleeve 24 are locked, since the first locking sleeve 23 and the second locking sleeve 24 are located on the same bolt 25, the first locking sleeve 23 and the second locking sleeves 24 are in close contact with each other. The first limiting structure and the second limiting structure cooperate with each other, so that the first locking sleeve 23 and the second locking sleeve 24 are relatively fixed, and further, the first mounting axis 30 and the second mounting axis 22 are relatively fixed. The angle and height of the fixing device 21 fixed on the second mounting axis 22 are relatively fixed. The bolt 25 is released. The first locking sleeve 23 and the second locking sleeve 24 are no longer in close contact with each other. The first limiting structure and the second limiting structure are separated from each other, and the second locking sleeve 24 can rotate around the bolt 25 with respect to the first locking sleeve 23, so that the angle of the second mounting axis 22 can be changed, thereby changing the relative angle and height of the fixing device 21.

In addition, when the second locking sleeve 24 releases the second mounting axis 22, the second mounting axis 22 can slide with respect to the second locking sleeve 24, thereby changing the position where the second locking sleeve 24 is sleeved on the second mounting axis 22, which is equivalent to changing the rotation radius of the fixing device 21 with respect to the bolt 25. The second mounting axis 22 can also be removed from the second locking sleeve 24. The second mounting axis 22 and the fixing device 21 constitute a self-timer, which is convenient to use. The second mounting axis 22 serves as a hand lever. When the first locking sleeve 23 releases the first mounting axis 30, the first locking sleeve 23 can be rotated with respect to the first mounting axis 30, and then the second mounting axis 22 can be rotated around the first mounting axis 30, which also realizes the angle change of the fixing device 21.

Specifically, the first locking sleeve 23 defines a first surface 231, the second locking sleeve 24 defines a second surface 241, the first limiting structure may be provided on the first surface 231, and the second limiting structure may be provided on the second surface 241. When the first locking sleeve 23 and the second locking sleeve 24 are locked, the first surface 231 is adjacent to the second surface 241. Preferably, the first surface 231 and the second surface 241 are both perpendicular to the bolt 25, and the first mounting axis 30 is a vertical axis. At this time, the rotation surface of the second mounting axis 22 is vertical surface.

In a specific embodiment, the first limiting structure is first teeth 231 distributed in an annular array around the bolt 25, the second limiting structure is second teeth distributed in an annular array around the bolt 25, and when locked, the first teeth 231 mesh with the second teeth 242. Through the meshing between the teeth, the first locking sleeve 23 and the second locking sleeve 24 are relatively fixed and cannot rotate with respect to the bolt 25.

A spring 27 is provided on the first locking sleeve 23 or the second locking, sleeve 24. When locked, the spring 27 provides such an elastic force that the first locking sleeve 23 tends to drive away from the second locking sleeve 24. In the process of releasing the bolt 25, the spring 27 provides such an elastic force that the first locking sleeve 23 automatically leaves the second locking sleeve 24, and the first tooth 231 leaves and no longer meshes with the second tooth 242, which is more convenient to use. The spring 27 is mounted in the mounting hole 201 of the first locking sleeve 23 and is hidden.

It should also be noted that, in a specific embodiment, a radial annular groove 31 is defined on an outer periphery of the first mounting axis 30, the first locking sleeve 23 is located at a corresponding position of the annular groove 31, and the bolt 25 is at least partially received in the annular groove 31. The bolt 25 is limited in the annular groove 31, that is, the bolt 25 can only rotate around the annular groove 31 with the first locking sleeve 23. When the bolt 25 leaves the annular groove 31 without pulling out the bolt 25 from the first locking sleeve 23, the bolt 25 cannot move in the axial direction of the first mounting axis 30, and further cannot change the axial position of the first locking sleeve 23 with respect to the first mounting axis 30.

Preferably, in, the present embodiment, the support 100 comprises two of the fixing devices 21, which are mounted at both ends of the second mounting axis 22, respectively. Therefore, two pieces of photographic equipment can be mounted at the same time.

Preferably, the fixing device 21 at least at one end is detachably connected to the second mounting axis 22, so that the second locking sleeve 24 is slidable out of the second mounting axis 22 from the end of the second mounting axis 22. The fixing device 21 at one end, can be detached from the second mounting axis 22, leaving the fixing device 21 at the other end. The second locking sleeve 24 releases the second mounting axis 22, and the second mounting axis 22 can be removed from the second locking sleeve 24, so that the fixing device 21 left on the second mounting axis 22 forms a selfie stick together with the second mounting axis 22.

Figure 5:
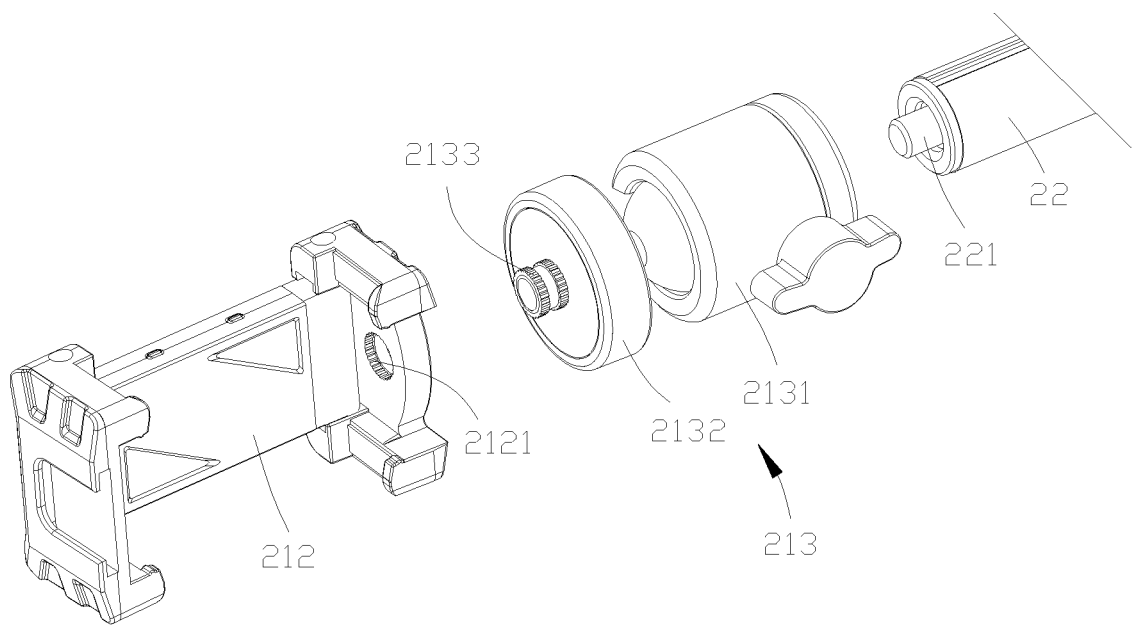
FIG. 5 is an exploded schematic diagram illustrating a fixing device in a first direction according to an embodiment of the present invention.
Figure 6:
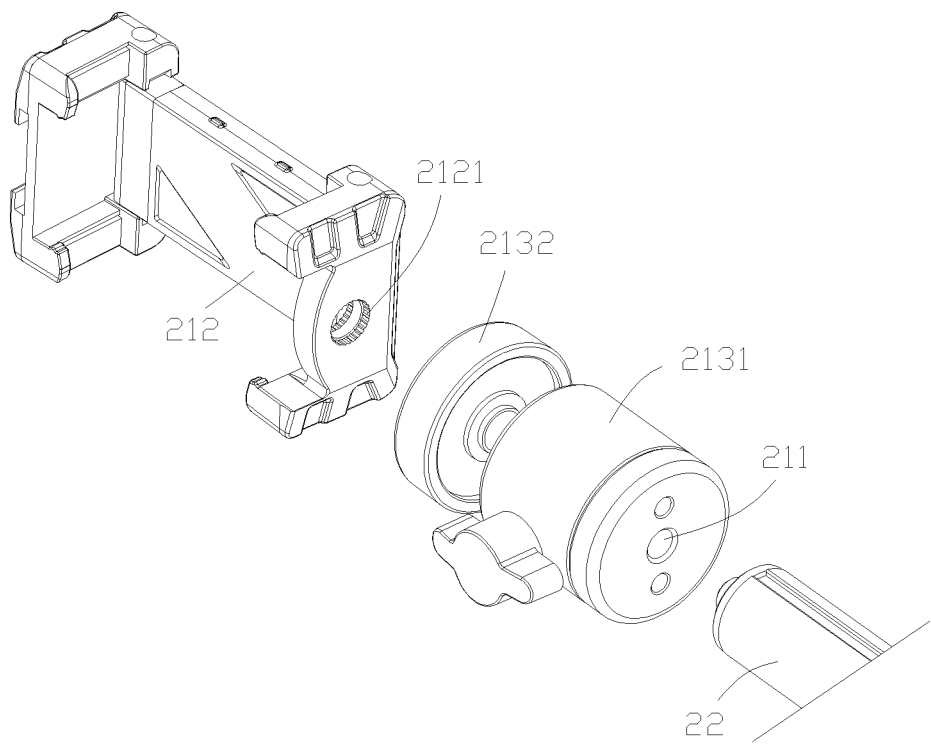
FIG. 6 is an exploded schematic diagram illustrating a fixing device in a second direction according to an embodiment of the present invention.

Specifically, as shown in FIGS. 5 and 6, the fixing device 21 and the second mounting axis 22 can be detachably connected in the following manner: the fixing device 21 has a first thread 211, the second mounting axis 22 is provided with a second thread 221 matching the first thread 211, and the first thread 211 is connected to the second thread 221. Of course, other detachable connection methods can also be used.

The fixing device 21 may comprise a clip body 212 and a pan-tilt 213. The clip body 212 may be a mobile phone clip for holding a mobile, phone. The pan-tilt 213 comprises a first rotating body 2131 and a second rotating body 2132. The first rotating body 2131 is connected to the second rotating body 2132 with a ball pair. The first thread 211 is provided on the first rotating body 2131, the second rotating body 2132 is provided with a third thread 2133 having the same structure as the second thread 221, and the clip body 212 is provided with a fourth thread 2121 having the same structure as the first thread 211. Therefore, the pan-tilt 213 can be detached from the second mounting axis 22, then the clip body 212 can be detached from the pan-tilt 213, and then the clip body 212 is connected to the second thread 211 through the fourth thread 2121 and is directly mounted on the second mounting axis 22.

Preferably, as shown in FIG. 1, one of the first rotating bodies 2131 of the pan-tilt 213 is coaxial with the second mounting axis 22, and another of the first rotating bodies 2131 of the pan-tilt 213 is perpendicular to the second mounting axis 22, thereby achieving horizontal shooting and vertical shooting.

The above description is only a preferred embodiment of the present invention and is not intended to limit the present invention. Any modification, equivalent substitution and improvement made within the spirit and principle of the present invention shall be included in the scope of protection of the present invention.

What is claimed is:

1. A photographic equipment support, comprising a support frame and a fixing component, wherein the support frame has a first mounting axis, the fixing component comprises a fixing device, a second mounting axis, a first locking sleeve, a second locking sleeve, a bolt and a locking member, the fixing device is used to fix photographic equipment, the fixing device is fixed on the second mounting axis, the first locking sleeve is sleeved on the first mounting axis, the second locking sleeve is sleeved on the second mounting axis, the bolt passes through mounting holes on the first locking, sleeve and the second locking sleeve, the locking member is threadedly connected to the bolt, the first locking sleeve has a first limiting structure, the second locking sleeve has a second limiting structure matching the first limiting structure, and when the first locking sleeve and the second locking sleeve are locked, the first limiting structure and the second limiting structure cooperate with each other, so that the first locking sleeve and the second locking sleeve are relatively fixed; and the first mounting axis is a vertical axis.

2. The photographic equipment support according to claim 1, wherein the first locking sleeve defines a first surface, the second locking sleeve defines a second surface, and when locked, the first surface is adjacent to the second surface.

3. The photographic equipment support according to claim 2, wherein the first surface and the second surface are both perpendicular to the bolt.

4. The photographic equipment support according to claim 2, wherein the first limiting structure is provided on the first surface, and the second limiting structure is provided on the second surface.

5. The photographic equipment support according to claim 4, wherein the first limiting structure is first teeth distributed in an annular array around the bolt, the second limiting structure is second teeth distributed in an annular array around the bolt, and when locked, the first teeth mesh with the second teeth.

6. The photographic equipment support according to claim 4, wherein a spring is provided on the first locking sleeve or the second locking sleeve, and when locked, the spring provides such an elastic force that the first locking sleeve tends to drive away from the second locking sleeve.

7. The photographic equipment support according to claim 6, wherein the spring is mounted in the mounting hole of the first locking sleeve.

8. The photographic equipment support according to claim 1, wherein a radial annular groove is defined on an outer periphery of the first mounting axis, the first locking sleeve is located at a corresponding position of the annular groove, and the bolt is at least partially received in the annular groove.

9. The photographic equipment support according to claim 1, comprising two fixing devices, which are mounted at both ends of the second mounting axis, respectively.

10. The photographic equipment support according to claim 9, wherein the fixing device at least at one end is detachably connected to the second mounting axis, so that the second locking sleeve is slidable out of the second mounting axis from the end of the second mounting axis.

11. The photographic equipment support according to claim 10, wherein the fixing device at least at one end has a first thread, the second mounting axis is provided with a second thread matching the first thread, and the first thread is connected to the second thread.

12. The photographic equipment support according to claim 11, wherein the two fixing devices comprise a clip body and a pan-tilt, respectively, the pan-tilt comprises a first rotating body and, a second rotating body, the first rotating body is connected to the second rotating body with a ball pair, the first thread is provided on the first rotating body, the second rotating body is provided with a third thread having the same structure as the second thread, and the clip body is provided with a fourth thread having the same structure as the first thread.

13. The photographic equipment support according to claim 12, wherein one of first rotating bodies of the pan-tilt is coaxial with the second mounting axis, and another of the first rotating bodies of the pan-tilt is perpendicular to the second mounting axis.

14. The photographic equipment support according to claim 12, wherein the photographic equipment is a mobile phone.

* * * * *